United States Patent
Mascianica et al.

(10) Patent No.: US 10,347,953 B2
(45) Date of Patent: Jul. 9, 2019

(54) BATTERY MODULE HAVING SIDE COMPRESSION STRUCTURE WITH HEAT EXCHANGER

(71) Applicant: FORD GLOBAL TECHNOLOGIES, LLC, Dearborn, MI (US)

(72) Inventors: Evan Mascianica, Ann Arbor, MI (US); Josef Dollison, Petersburg, MI (US); Jeremy Samborsky, Livonia, MI (US); Daniel Miller, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1006 days.

(21) Appl. No.: 14/558,234

(22) Filed: Dec. 2, 2014

(65) Prior Publication Data
US 2016/0156074 A1 Jun. 2, 2016

(51) Int. Cl.
- *H01M 2/10* (2006.01)
- *H01M 10/613* (2014.01)
- *H01M 10/6556* (2014.01)
- *H01M 10/625* (2014.01)

(52) U.S. Cl.
CPC ....... *H01M 10/613* (2015.04); *H01M 2/1077* (2013.01); *H01M 10/625* (2015.04); *H01M 10/6556* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 5,756,227 A | 5/1998 | Suzuki et al. | |
| 7,531,270 B2 | 5/2009 | Buck et al. | |
| 8,394,525 B2 | 3/2013 | Maguire et al. | |
| 8,741,466 B2 | 6/2014 | Youngs et al. | |
| 2011/0309799 A1 | 12/2011 | Firehammer | |
| 2012/0114985 A1* | 5/2012 | Kim | H01M 2/1077 429/53 |
| 2012/0129024 A1 | 5/2012 | Marchio et al. | |
| 2015/0249238 A1* | 9/2015 | Andre | B60K 1/04 429/99 |

FOREIGN PATENT DOCUMENTS

| | | | |
|---|---|---|---|
| CN | 103943913 A | 7/2014 | |
| FR | 2967821 A1 | 5/2012 | |
| WO | WO 2012/160573 | * 11/2012 | |

* cited by examiner

*Primary Examiner* — Jonathan Crepeau
(74) *Attorney, Agent, or Firm* — Carlson, Gaskey & Olds, P.C.

(57) ABSTRACT

A battery module according to an exemplary aspect of the present disclosure includes, among other things, a first array of battery cells along a first axis, and a second array of battery cells along a second axis. The battery cells of the first and second arrays each include axially facing walls. The battery module further includes a compression structure providing a heat exchanger. The compression structure is adjacent axially facing walls of a battery cell of the first array and a battery cell of the second array.

19 Claims, 4 Drawing Sheets

BATTERY MODULE HAVING SIDE COMPRESSION STRUCTURE WITH HEAT EXCHANGER

BACKGROUND

Electric vehicles, such as hybrid electric vehicles (HEVs), use electric machines instead of, or in addition to, an internal combustion engine. Electric vehicles are typically equipped with a battery pack including one or more battery modules. The battery modules includes a plurality of battery cells. One known type of battery module includes compression structures adjacent the base, sides, ends, and top of the module. The compression structures retain the battery cells and provide dimensional stability necessary for the function and durability of the battery architecture.

SUMMARY

A battery module according to an exemplary aspect of the present disclosure includes, among other things, a first array of battery cells along a first axis, and a second array of battery cells along a second axis. The battery cells of the first and second arrays each include axially facing walls. The battery module further includes a compression structure providing a heat exchanger. The compression structure is adjacent axially facing walls of a battery cell of the first array and a battery cell of the second array.

In a further non-limiting embodiment of the foregoing battery module, the battery module includes a base. The battery cells are supported on the base.

In a further non-limiting embodiment of the foregoing battery module, the compression structure is a side compression structure extending upward from the base. The side compression structure extends along a length of the battery module.

In a further non-limiting embodiment of the foregoing battery module, the battery module includes a first side compression structure and a second side compression structure extending upward from opposed sides of the base.

In a further non-limiting embodiment of the foregoing battery module, the battery module includes a first end structure and a second end structure at opposed ends of the battery module. The first and second end structures extend between the first and second side compression structures.

In a further non-limiting embodiment of the foregoing battery module, the second axis is spaced apart from the first axis, and the second axis parallel to the first axis.

In a further non-limiting embodiment of the foregoing battery module, the battery module includes third, fourth, and fifth arrays of battery cells. The compression structure is adjacent axially facing walls of a battery cell of each of the third, fourth, and fifth arrays.

In a further non-limiting embodiment of the foregoing battery module, the compression structure includes a passageway for directing a fluid along the length of the battery module. The passageway includes an inlet port for receiving the fluid from a fluid source and an outlet port for directing the fluid to a fluid return.

In a further non-limiting embodiment of the foregoing battery module, the compression structure includes a first longitudinal passageway portion, a second longitudinal passageway portion, and a turning portion between the first and second longitudinal passageway portions.

In a further non-limiting embodiment of the foregoing battery module, the first longitudinal passageway portion is between the inlet port and the turning portion, and the second longitudinal passageway portion is between the turning portion and the outlet port.

A battery module according to another exemplary aspect of the present disclosure includes, among other things, a first array of battery cells extending along a first axis and a second array of battery cells extending along a second axis. The second axis is spaced apart from the first axis. Further, the battery module includes a compression structure adjacent a cell of the first array and a cell of the second array. The compression structure provides a heat exchanger.

In a further non-limiting embodiment of the foregoing battery module, the compression structure extends along a length of the battery module.

In a further non-limiting embodiment of the foregoing battery module, the compression structure includes a passageway for directing a fluid within the compression structure.

In a further non-limiting embodiment of the foregoing battery module, the compression structure includes at least one passageway for directing a fluid along the length of the battery module. The at least one passageway includes an inlet port for receiving the fluid from a fluid source and an outlet port for directing the fluid to a fluid return.

In a further non-limiting embodiment of the foregoing battery module, the compression structure is a first side compression structure, and wherein the battery module includes a second side compression structure, the first and second arrays extending between the first and second side compression structures along the respective first and second axes.

In a further non-limiting embodiment of the foregoing battery module, the battery module includes a base. The battery cells are supported on the base.

In a further non-limiting embodiment of the foregoing battery module, the first and second side compression structures extend upward from opposed sides of the base.

In a further non-limiting embodiment of the foregoing battery module, the battery module includes end structures extending between the first and second side compression structures.

A method according to an exemplary aspect of the present disclosure includes, among other things, the step of establishing a flow of fluid within a passageway of a side compression structure of a battery module.

In a further non-limiting embodiment of the foregoing method, the battery module includes first and second arrays of battery cells extending along respective first and second axes. Each of the battery cells includes axially facing walls facing a respective one of the first and second axes. Further, the side compression structure is adjacent axially facing walls of a battery cell of the first array and a battery cell of the second array.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

This disclosure relates to a battery module having a side compression structure which provides a heat exchanger.

Figure 1:
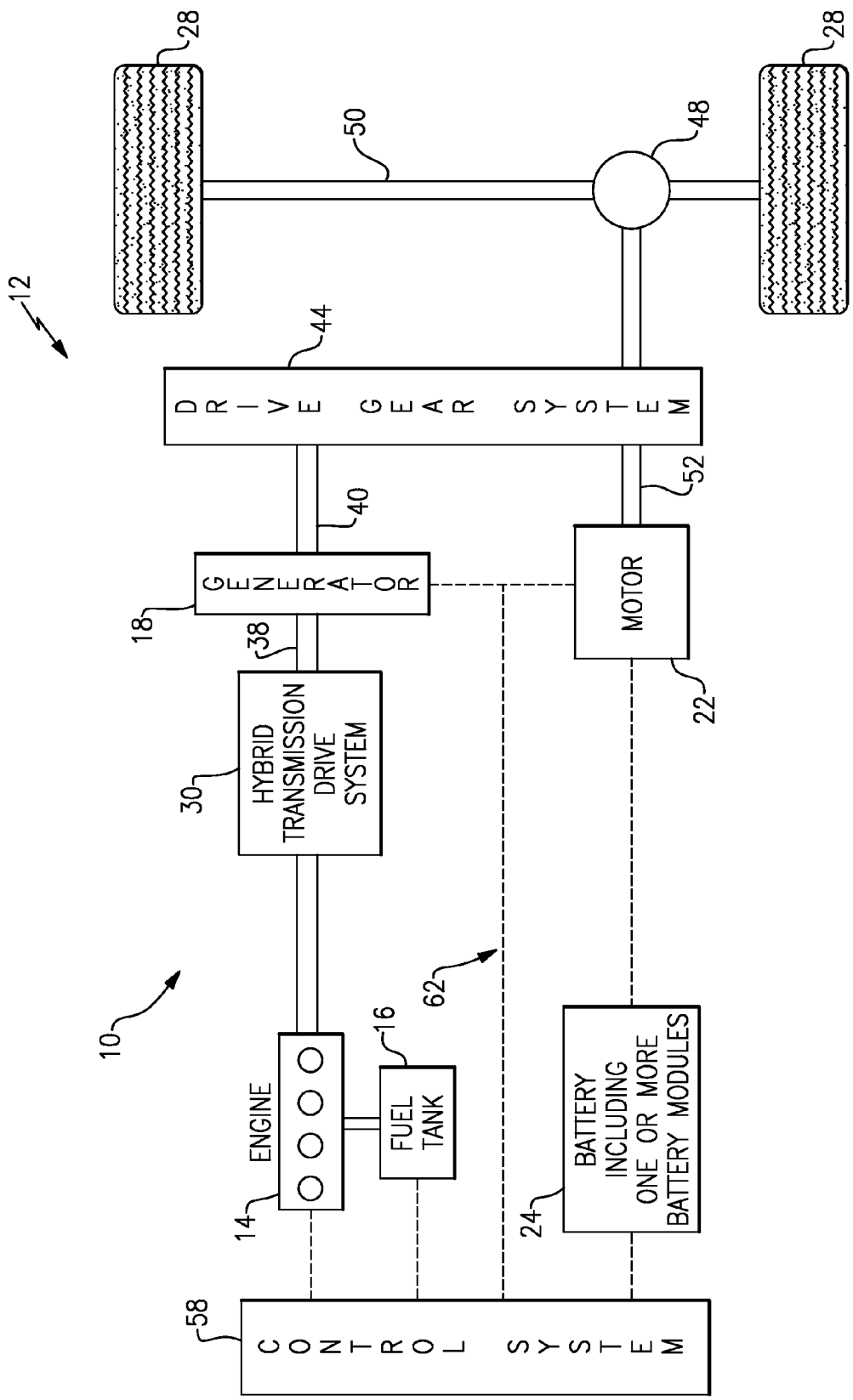
FIG. 1 schematically illustrates a powertrain of a vehicle.

FIG. 1 schematically illustrates a powertrain of a vehicle 12, which, in this example, is an electrified vehicle. Although depicted as a hybrid electric vehicle (HEV), it should be understood that the concepts described herein are not limited to HEVs and could extend to other vehicles, including, but not limited to, plug-in hybrid electric vehicles (PHEVs), battery electric vehicles (BEVs), and modular hybrid transmission vehicles.

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery 24. In this embodiment, the second drive system is considered an electric drive system of the powertrain 10. The first and second drive systems generate torque to drive one or more sets of vehicle drive wheels 28 of the vehicle 12.

The engine 14, which is an internal combustion engine (ICE) in this embodiment, receives fuel, such as gasoline, from a fuel tank 16. Depending on the type of vehicle, fuels other than gasoline may be used. The engine 14 and the generator 18 may be connected through a power transfer unit 30, which in this example is a hybrid transmission gear system, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear, a sun gear, and a carrier assembly.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The power transfer unit 30 may be connected to a shaft 40, which is connected to vehicle drive wheels 28 through a second power transfer unit 44, which in this example is a drive gear system. The second power transfer unit 44 may include a gear set having a plurality of gears. Other power transfer units may also be suitable. The second power transfer unit 44 transfers torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery 24.

The battery 24 is one exemplary type of an electrified vehicle battery assembly and may take the form of a high voltage battery that is capable of outputting electrical power to operate the motor 22 and/or the generator 18. The battery 24 may include one or more battery modules 64 (FIG. 2) connected in parallel or in series, depending on the application. Other types of energy storage devices and/or output devices can also be used to supply power within the vehicle 12.

The powertrain 10 may additionally include a control system 58 (or, "controller") for monitoring and/or controlling various aspects of the vehicle 12. For example, the control system 58 may communicate with the electric drive system, the power transfer units 30, 44, or other components to monitor the vehicle 12, control the vehicle 12, or both.

The control system 58 includes electronics, software, or both, to perform the necessary control functions for operating the vehicle 12. In one non-limiting embodiment, the control system 58 is a combination vehicle system controller and powertrain control module (VSC/PCM). Although it is shown as a single hardware device, the control system 58 may include multiple controllers in the form of multiple hardware devices, or multiple software controllers within one or more hardware devices. A controller area network (CAN) 62 allows the control system 58 to communicate with the various component of the vehicle 12.

Figure 2:
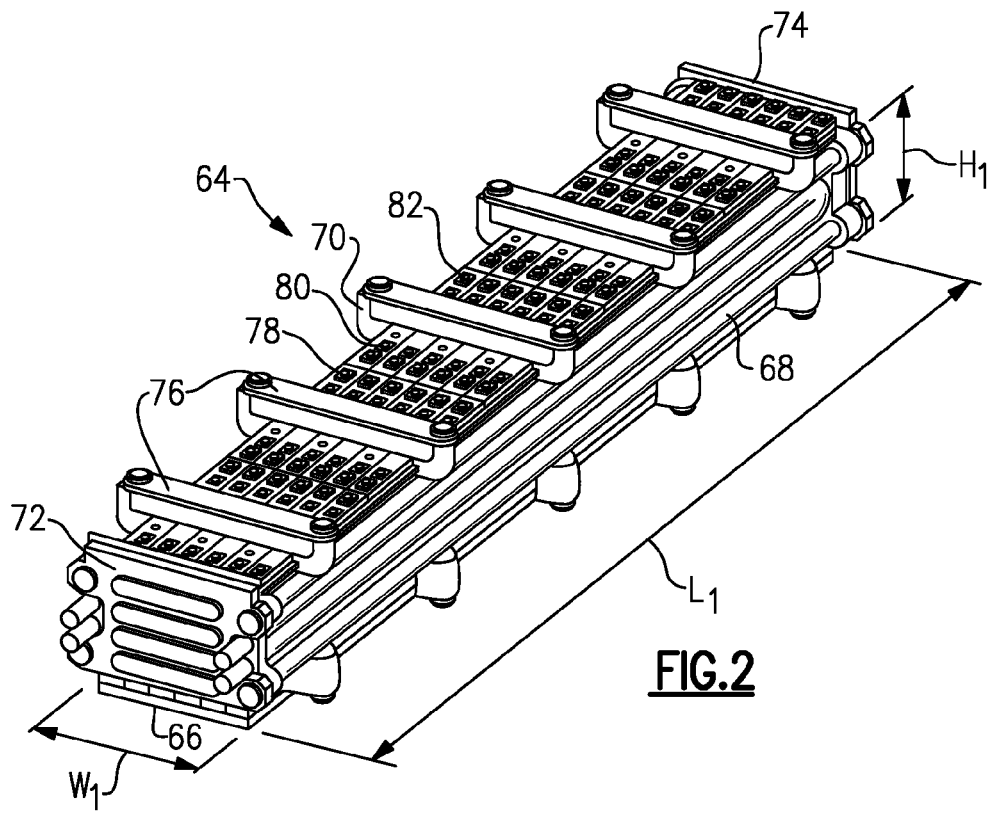
FIG. 2 is a perspective view of an example battery module.

An example battery module 64 is illustrated in FIG. 2. In this example, the example battery module 64 has a length $L_1$, a width $W_1$, and a height $H_1$. The length $L_1$ of the battery module is longer than the width $W_1$, and in one example the ratio of the length $L_1$ to the width $W_1$ is about 5 to 1.

Figure 3:
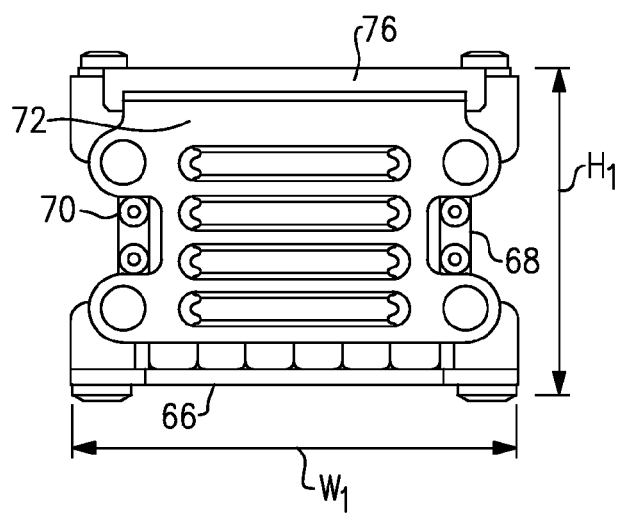
FIG. 3 is an end view of the battery module of FIG. 2.

As illustrated between FIGS. 2 and 3, the battery module 64 includes a base 66 having a width $W_1$ and a length $L_1$. First and second side compression structures 68, 70 are attached to, and extend upwardly from, the base 66 in the direction of the height $H_1$. The first and second side compression structures 68, 70 extend along the length $L_1$ of the battery module 64 between opposed first and second end structures 72, 74. The first and second end structures 72, 74 span between the side compression structures 68, 70 in the direction of the width $W_1$ of the battery module 64. Additionally, a plurality (five, in this example) of top rails 76 are provided between the opposed side compression structures 68, 70. The top rails 76 also span between the side compression structures 68, 70 in the direction of the width $W_1$ of the battery module 64.

Together, the base 66, the side compression structures 68, 70, the end structures 72, 74, and the top rails 76 retain a plurality of battery cells 78 ("cells 78") within the vehicle 12. It should be understood that the base 66, the side compression structures 68, 70, the end structures 72, 74, and the top rails 76 can be attached together using a number of known techniques. For instance, in one example, the structures are fastened together using known types of fasteners, such as nuts and bolts. In another example, at least some of the structures are welded together.

Again, a plurality of cells 78 are retained within the battery module 64. The upper surface of each cell 78 includes two terminals 80, 82. In this example, the cells 78 are arranged such that the terminals 80, 82 are connected together in series by a plurality of bus bars. The cells 78 could be connected in parallel, however.

Figure 4:
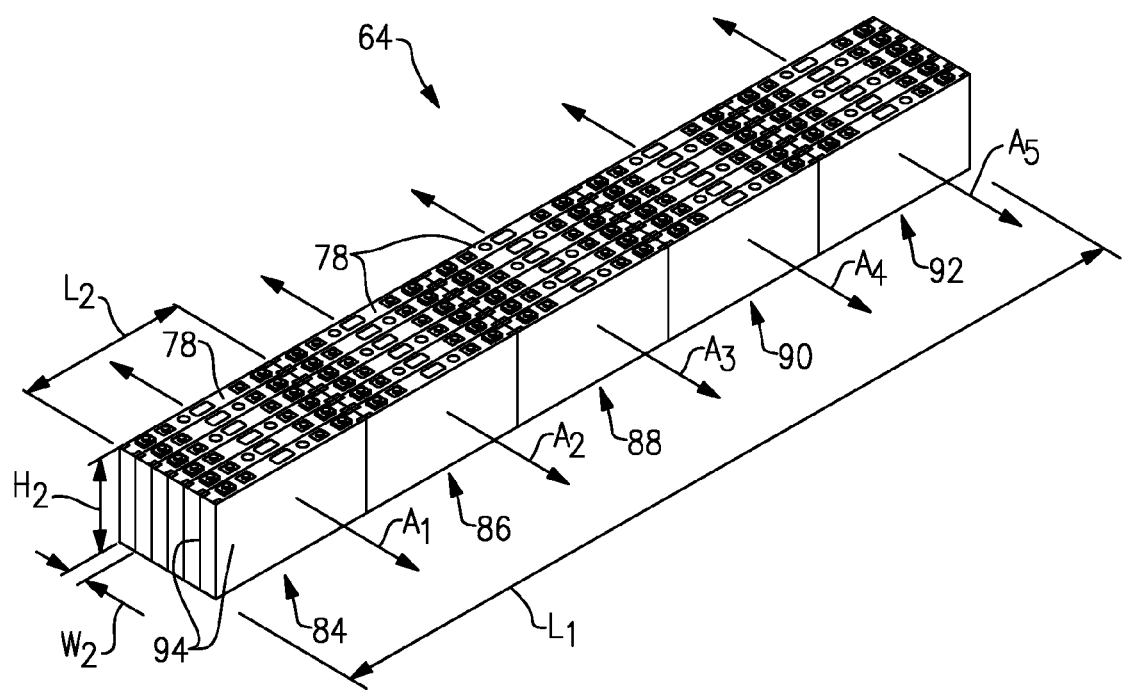
FIG. 4 illustrates the arrangement of the cells within the battery module of FIG. 2.

FIG. 4 shows, for purposes of illustration, the cells 78 without the corresponding support structure of the battery module 64. As illustrated, the cells 78 are arranged in a plurality of arrays 84, 86, 88, 90, 92. While five arrays are illustrated, it should be understood that this disclosure extends to battery modules containing a different number of arrays.

With reference to the first array 84, each of the cells 78 has a length $L_2$, a width $W_2$, and a height $H_2$. In this example, the length $L_2$ of the cells 78 is longer than the width $W_2$. Further, the first array 84 includes six cells 78 in the illustrated example. It should be understood that the array 84 may include a different number of cells, however.

Within each array, the cells 78 are arranged such that their length $L_2$ is parallel to the length $L_1$ of the module 64. In particular, within the first array 84, axially facing walls 94 of the cells 78 having a length $L_2$ and a height $H_2$ are arranged along a common, first axis $A_1$. Each battery cell 78 includes two, opposed axially facing walls 94. The remaining walls of the battery cells 78 face away from the first axis $A_1$, and are thus not "axially facing." Further, as shown, the first axis $A_1$ extends perpendicular to an outer surface of the axially facing walls 94. The first axis $A_1$ is also perpendicular to the direction of the length $L_1$ of the battery module 64.

The cells 78 of the second array 86 are arranged adjacent the cells 78 of the first array 84. The cells 78 in the second array 86 are arranged along a second axis $A_2$ in substantially the same way as the cells 78 of the first array 84 are arranged along the first axis $A_1$. The cells from the arrays 88, 90 and 92 are also similarly arranged, and extend along respective axes $A_3$, $A_4$, $A_5$. Each of the axes $A_1$-$A_5$ are spaced apart from one another along the length $L_1$ of the battery module, are parallel to one another, and are each perpendicular to the length $L_1$ of the battery module 64.

By arranging the cells 78 within the battery module 64 as shown in FIG. 4, the relatively large surface area provided by the axially facing walls 94 of the cells 78 is exposed to the side compression structures 68, 70. As will be discussed below, the arrangement of the cells 78 shown in FIG. 4 can result in more effective heat transfer (e.g., cooling) relative to the cells 78.

Figure 5:
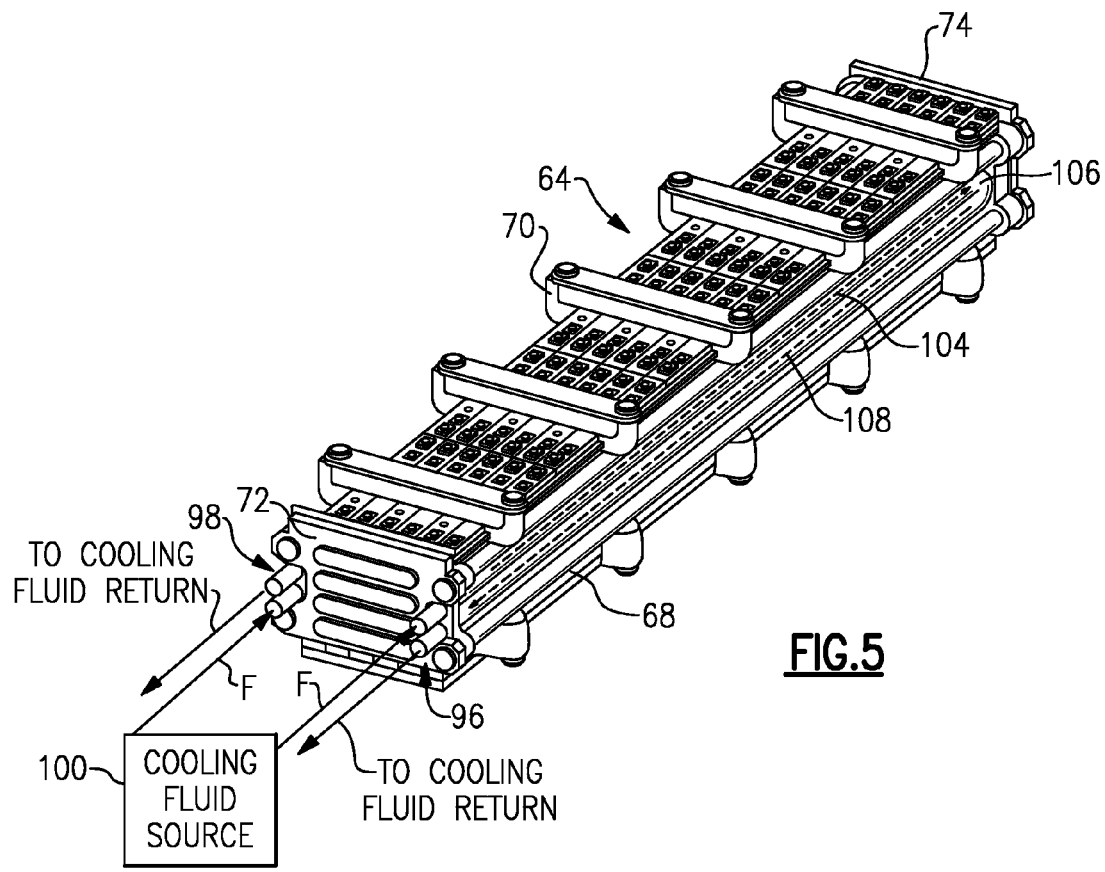
FIG. 5 schematically illustrates a cooling arrangement associated with the battery module of FIG. 2.
Figure 6:
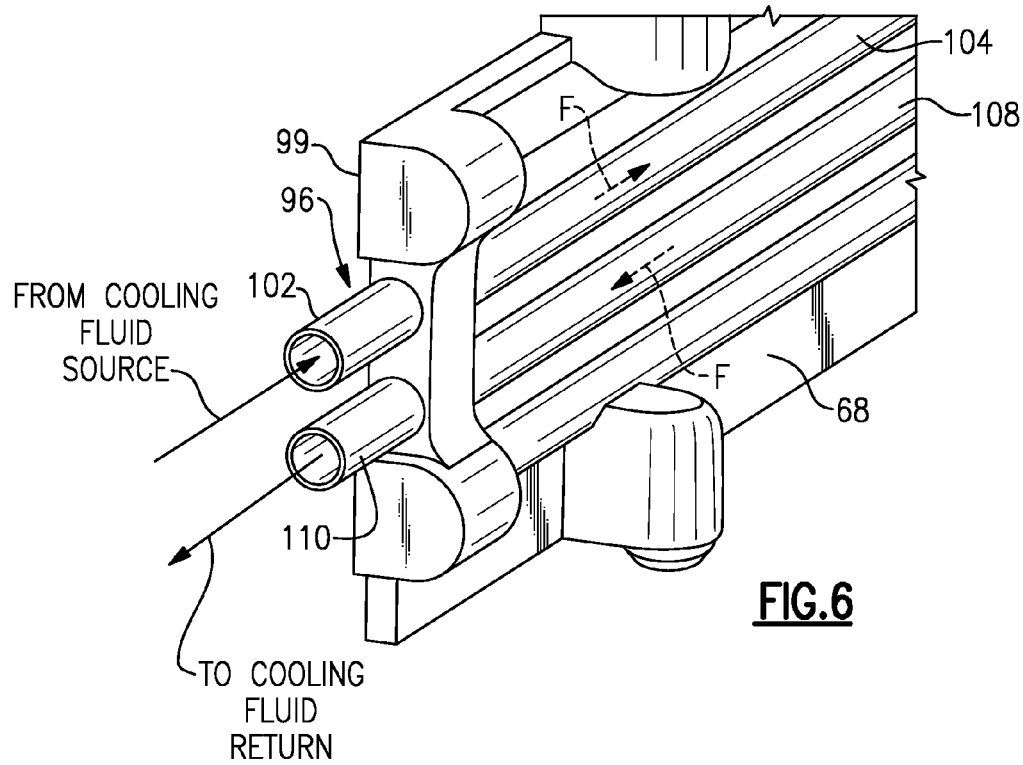
FIG. 6 is a close-up view of a side compression structure of the battery module of FIG. 2.

With joint reference to FIGS. 5 and 6, the side compression structures 68, 70 each provide a heat exchanger. As shown, each of the side compression structures 68, 70 includes a passageway 96, 98 for directing a cooling fluid F from a cooling fluid source 100 within the respective side compression structures 68, 70. The cooling fluid source 100 may include one or more pumps operable in response to commands from a controller, such as the control system 58.

The side compression structures 68, 70 are integrally formed with the passageways 96, 98 in one example. Alternatively, the passageways 96, 98 may be formed separately from the side compression structures 68, 70, and then later attached. The passageways 96, 98, are provided adjacent an inner face (see inner face 99 in FIG. 6) of the side compression structures 68, 70. The cells 78 may be arranged such that they directly contact the inner faces of the side compression structures 68, 70 (e.g., the surface of the axially facing walls 94 of the cells from each array would directly contact the inner face 99). Alternatively, there may be an intermediate insulating or conductive layer between the inner faces 99 and the cells 78.

FIG. 6 illustrates the detail of the passageway 96 associated with the first side compression structure 68. While FIG. 6 only shows the side compression structure 68, it should be understood that the passageway 98 of the second side compression structure 70 is similarly arranged. As shown, the passageway 96 of the first side compression structure 68 includes an inlet port 102, a first longitudinal cooling portion 104, a turning portion 106 (seen FIG. 5), a second longitudinal cooling portion 108, and an outlet port 110.

During operation of the vehicle 12, the cells 78 generate heat. Upon command from the control system 58, for example, cooling fluid F from the cooling fluid source 100 is directed into the inlet port 102, and initially flows along the length $L_1$ of the battery module 64 through the first longitudinal cooling portion 104 toward the opposite end of the battery module 64. The cooling fluid F is then turned by a turning portion 106 toward the second longitudinal cooling portion 108. The second longitudinal cooling portion 108 directs the cooling fluid F back to the outlet port 110, which in this example is adjacent the inlet port 102. Downstream of the outlet port 110, the cooling fluid F is either directed to a cooling fluid return or to the inlet port of an adjacent module (e.g., the vehicle 12 may include more than one battery module 12).

While two longitudinal cooling portions 104, 108 are illustrated in FIG. 5, there could be a different number of longitudinal cooling portions. In one example, there may be a single longitudinal cooling portion. In that example, the outlet port would be provided on an opposite end of the battery module from the inlet port. In other examples, there are three or more longitudinal cooling portions. In those examples, there are additional turning portions between the longitudinal cooling portions. Further, while the illustrated turning portion 106 generally has a U-shape, it should be understood that other types of turning portions come within the scope of this disclosure.

It should be understood that the cooling fluid F may be any known cooling fluid including a refrigerant, water, or air, to name a few examples. Further, in vehicles including more than one battery module 64, it is possible to share a common side compression structure between adjacent modules. In that instance, a single side compression structure would be used to cool and retain the cells from adjacent modules.

Arranging the cells 78 such that the relatively large surface area of the axially facing walls (e.g., axially facing walls 94) is exposed to the heat exchangers of the side compression structures 68, 70 provides more consistent, and more effective cooling, of the cells 78. In particular, using the disclosed arrangement, there are more cells 78 in close proximity to a heat exchanger. Additionally, integrating a heat exchanger with the side compression structures 68, 70 reduces the number of parts in the system, which in turn increases the ease of system assembly, reduces overall cost, and saves on space.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A battery module, comprising:
a first array of battery cells along a first axis extending perpendicular to a direction of a length of the battery module;
a second array of battery cells along a second axis spaced-apart from and parallel to the first axis, the first and second axes extending perpendicular to axially facing walls of the cells within a respective one of the first and second arrays, the axially facing walls providing an increased surface area relative to the remaining walls of the battery cells; and
a compression structure providing a beat exchanger positioned adjacent axially facing walls of the first and second arrays,
wherein the battery cells in each array are in direct contact with one another.

2. The battery module as recited in claim 1, wherein the battery module includes a base, the battery cells supported on the base.

3. The battery module as recited in claim 2, wherein the compression structure is a side compression structure extending upward from the base, the side compression structure extending along a length of the battery module.

4. The battery module as recited in claim 3, wherein the battery module includes a first side compression structure and a second side compression structure extending upward from opposed sides of the base.

5. The battery module as recited in claim 4, wherein the battery module includes a first end structure and a second end structure at opposed ends of the battery module, the first and second end structures extending between the first and second side compression structures.

6. The battery module as recited in claim 1, wherein the battery module includes third, fourth, and fifth arrays of battery cells, the compression structure adjacent axially facing walls of a battery cell of each of the third, fourth, and fifth arrays.

7. The battery module as recited in claim 1, wherein the compression structure includes a passageway for directing a fluid along the length of the battery module, the passageway including an inlet port for receiving the fluid from a fluid source and an outlet port for directing the fluid to a fluid return.

8. The battery module as recited in claim 7, wherein the compression structure includes a first longitudinal passageway portion, a second longitudinal passageway portion, and a turning portion between the first and second longitudinal passageway portions.

9. The battery module as recited in claim 8, wherein the first longitudinal passageway portion is between the inlet port and the turning portion, and wherein the second longitudinal passageway portion is between the turning portion and the outlet port.

10. A battery module, comprising:
a first array of battery cells extending along a first axis perpendicular to a direction of a length of the battery module;
a second array of battery cells extending along a second axis spaced apart from and parallel to the first axis; and
a compression structure providing a heat exchanger adjacent cells of the first and second arrays,
wherein the compression structure includes at least one passageway for directing a fluid along the length of the battery module, the at least one passageway including an inlet port for receiving the fluid from a fluid source and an outlet port for directing the fluid to a fluid return,
wherein the battery cells in each array are in direct contact with one another.

11. The battery module as recited in claim 10, wherein the compression structure extends along a length of the battery module.

12. The battery module as recited in claim 10, wherein the compression structure includes a passageway for directing a fluid within the compression structure.

13. A battery module, comprising:
a first array of battery cells extending along a first axis perpendicular to a direction of a length of the battery module;
a second array of battery cells extending along a second axis spaced apart from and parallel to the first axis; and
a compression structure providing a heat exchanger adjacent cells of the first and second arrays;
wherein the compression structure is a first side compression structure, and wherein the battery module includes a second side compression structure, the first and second arrays extending between the first and second side compression structures along the respective first and second axes,
wherein the hatter cells in each array are in direct contact with one another.

14. The battery module as recited in claim 13, wherein the battery module includes a base, the battery cells supported on the base.

15. The battery module as recited in claim 14, wherein the first and second side compression structures extend upward from opposed sides of the base.

16. The battery module as recited in claim 15, wherein the battery module includes end structures extending between the first and second side compression structures.

17. A method, comprising:
establishing a flow of fluid within a passageway of a side compression structure of a battery module, the flow of fluid flowing in a direction parallel to a direction of the length of the battery module, wherein the battery module includes first and second arrays of battery cells extending along respective first and second axes extending perpendicular to the direction of the length of the battery module, wherein the first and second axes extend perpendicular to axially facing walls of the first and second arrays, respectively, and wherein the side compression structure is positioned adjacent the axially facing walls of the first and second arrays,
wherein the battery cells in each array are in direct contact with one another.

18. The battery module as recited in claim 1, wherein the length of the battery module is the longest dimension of the battery module.

19. The battery module as recited in claim 18, wherein a ratio of the length of the battery module to a width of the battery module is about 5 to 1.

* * * * *